United States Patent [19]
Jones

[11] 4,333,662
[45] Jun. 8, 1982

[54] PIPE SEAL

[76] Inventor: William D. Jones, 803 Monaco Dr., Warrington, Pa. 18976

[21] Appl. No.: 214,692

[22] Filed: Dec. 9, 1980

[51] Int. Cl.³ .................. F16L 21/02; F16J 15/32
[52] U.S. Cl. .................. 277/207 A; 277/189; 277/34.3; 285/230
[58] Field of Search .......... 285/230, 290, 291, 158, 285/189; 277/207 A, 34.3, 226, 189

[56] References Cited
U.S. PATENT DOCUMENTS

| B 313,280 | 4/1976 | Schuldink | 277/207 A |
|---|---|---|---|
| 2,607,966 | 8/1952 | Beck | 277/226 |
| 3,787,061 | 1/1974 | Yoakum | 285/230 |
| 3,907,310 | 9/1975 | DuFour | 277/226 |
| 4,186,931 | 2/1980 | Anderson | 277/207 A |

Primary Examiner—Robert I. Smith
Attorney, Agent, or Firm—Howson and Howson

[57] ABSTRACT

A gasket which is particularly suited for sealing the annular space between a pipe and a port in an underground structure is disclosed. The gasket comprises a hollow annular ring which surrounds the pipe and is connected by a narrow neck to a base at least partially embedded in the underground structure. The base has means extending around its outer periphery to mount the seal securely in the manhole and to provide a block against water seepage across the periphery of the gasket.

14 Claims, 7 Drawing Figures

PIPE SEAL

FIELD OF THE INVENTION

The present invention relates to gaskets for sealing the annular gaps between pipes and structures into which the pipes extend. More particularly, the present invention relates to gaskets for use in sealing connections between sewer pipes and underground structures such as manholes.

BACKGROUND OF THE INVENTION

In sewer lines it is customary for manholes to be installed at various intervals such as where the sewer line changes elevation or direction. Conventional manholes are fabricated of cast concrete and are provided with one or more pipe-receiving ports which receive the ends of sewer pipes. In order to prevent ground water from infiltrating the manhole, and to prevent sewage in the manhole from leaking outwardly to pollute the ground water, seals or gaskets are normally used to seal the gap between the outer periphery of the pipe and the inner periphery of the port in the manhole.

Various types of seals have been proposed for this purpose. One such seal is disclosed in U.S. Pat. No. 3,759,280. This seal has a base fastened to, or embedded within, the concrete of the manhole around the pipe-receiving port and a neck which extends outwardly from the manhole along the outside of the pipe and which is fastened to the outer periphery of the pipe by a clamp.

Another pipe to manhole seal is disclosed in U.S. Pat. No. 3,813,107 and its companion U.S. Pat. No. 3,832,438. This seal has a generally triangular cross-section with a hollow pipe-engaging portion and a pair of outturned flanges which are molded into the concrete during pouring of the manhole.

Another pipe to manhole seal is disclosed in U.S. Pat. No. 3,874,063. This seal assembly has a portion molded into the concrete manhole and a lateral annular recess adapted to receive an annular wedge. The wedge is driven into the recess after the pipe has been installed to provide a fluid-tight connection.

U.S. Pat. Nos. 4,159,829, and its companion 4,073,048, each disclose another type of gasket for a sewer pipe to manhole connection. This patented gasket has a hollow pipe-engaging portion and a T-shaped base which is molded into the concrete while the manhole is being poured.

U.S. Pat. No. 4,103,901 discloses a pipe to manhole seal having a base portion molded into the concrete of the manhole and a pipe-engaging portion adapted to be secured around the pipe by a pipe clamp.

U.S. Pat. No. 2,257,119 discloses several different embodiments of a seal for a cylindrical member such as a shaft.

While each of the above disclosed patented devices may function satisfactorily for its intended purpose, none has all of the attributes of a commercially desirable seal. For instance, such a seal should provide leak resistance up to 10 psi. and should enable the pipe to be deflected omnidirectionally up to 20° with respect to its receiving port. A satisfactory pipe seal should also prevent the pipe from contacting the bottom of the pipe-receiving port in response to transverse shear loads on the pipe as may be imposed by backfill and traffic loads adjacent the manhole. The seal should also be sufficiently compressible as to accommodate variations in the outside diameters of pipes of different materials which have the same nominal inside diameters. The seal should also be mounted securely in place and should be capable of in-field adjustments and repair to accommodate unusual situations. A desirable seal must also be sufficiently foolproof as to be capable of being installed by relatively unskilled labor, and the seal must be capable of being installed rapidly and in a minimum amount of time.

OBJECTS OF THE INVENTION

With the foregoing in mind, an object of the present invention is to provide a novel seal which provides all of the aforesaid desirable characteristics in sealing the annular space between a pipe and its receiving structure.

A further object of the present invention is to provide a seal assembly which is particularly suited for sealing pipe to manhole joints while permitting the pipe to be disposed at omnidirectional angles of up to 20° with respect to the center line of the pipe-receiving port.

Yet another object of the present invention is to provide a manhole to pipe seal which insures the interposition of resilient material between the bottom of the pipe and its receiving port to prevent pipe damage in the event that excessive shear loads on the pipe cause it to bottom-out in the port.

A still further object of the present invention is to provide a pipe seal which accommodates variations in the outside diameters of pipes of different materials having nominal inside diameters and which can be field-adjusted to accommodate unusual installation situations.

It is a still further object of the present invention to provide a manhole to pipe seal which resists transmission of fluids through the concrete around the outer periphery of the seal as well as along the pipe with which it is used.

Yet another object of the present invention is to provide a seal assembly which is capable of being installed properly and rapidly by relatively unskilled labor.

SUMMARY OF THE INVENTION

More specifically, the present invention provides an improved seal which is particularly suited for use in sealing the annular space between the inner periphery of a port in a manhole and a sewer pipe received therein. The seal comprises an annular hollow ring which engages the outer periphery of the pipe and which is connected to a base by means of a narrow neck which affords movement of the ring relative to the base. The base is at least partially embedded in the concrete of the manhole and has means around its periphery providing a water stop to preclude the transmission of water lengthwise of the pipe. Preferably, the base extends laterally of the neck beyond the ring to provide a cross-section having a widthwise dimension which is greater than its radial dimension. Preferably, a pair of mounting rings are provided to mount the seal securely and to provide a water stop. The mounting rings have flanges received in a pair of lateral recesses in the base of the seal and a pair of inturned mounting flanges extending outwardly into engagement with the surrounding concrete of the manhole. The installed seal resists fluid leakage and is relatively easy to install properly.

BRIEF DESCRIPTION OF THE DRAWINGS

The foregoing and other objects, features and advantages of the present invention should become apparent from the following description when taken in conjunction with the accompanying drawings, in which.

DESCRIPTION OF PREFERRED EMBODIMENT

Figure 1:
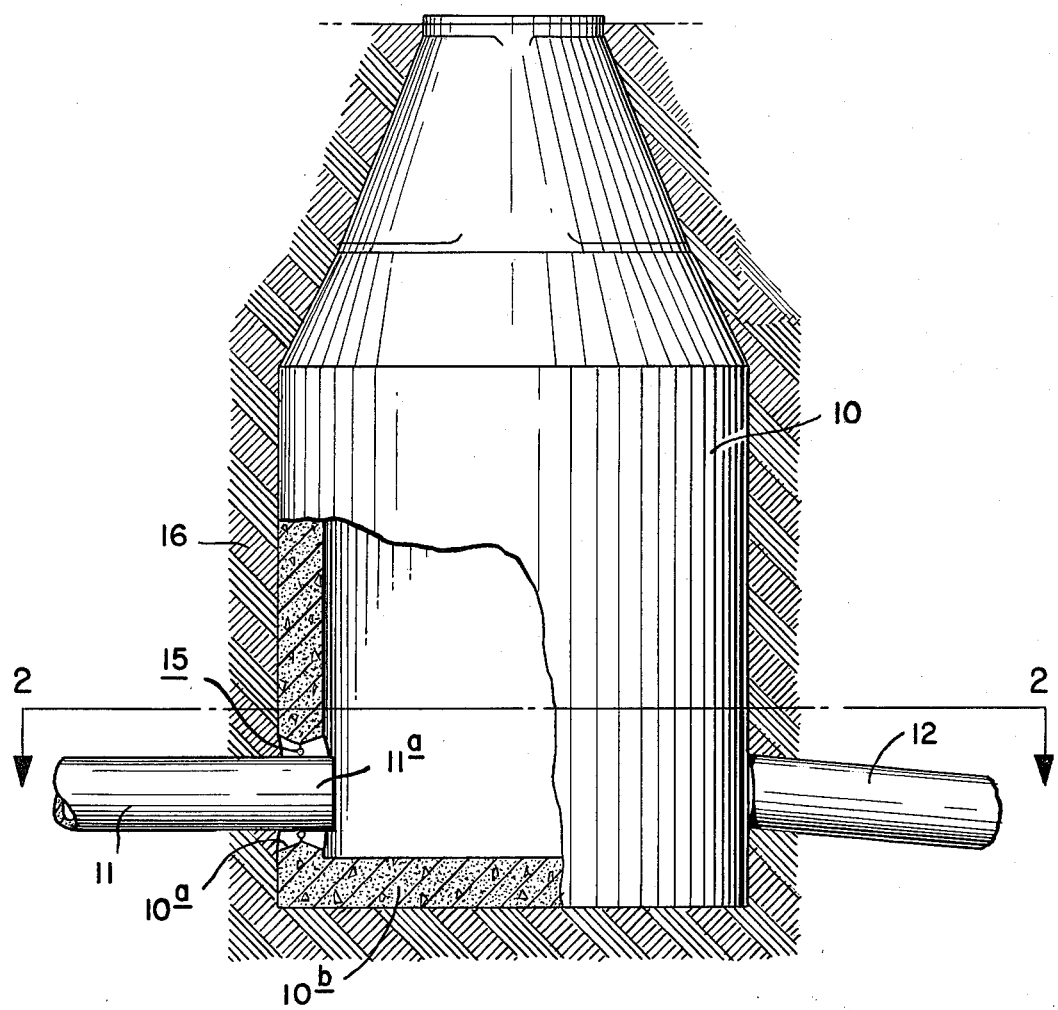
FIG. 1 is an elevational view of a manhole having portions broken away and sectioned to illustrate a pipe and a seal assembly which embodies the present invention.
Figure 2:
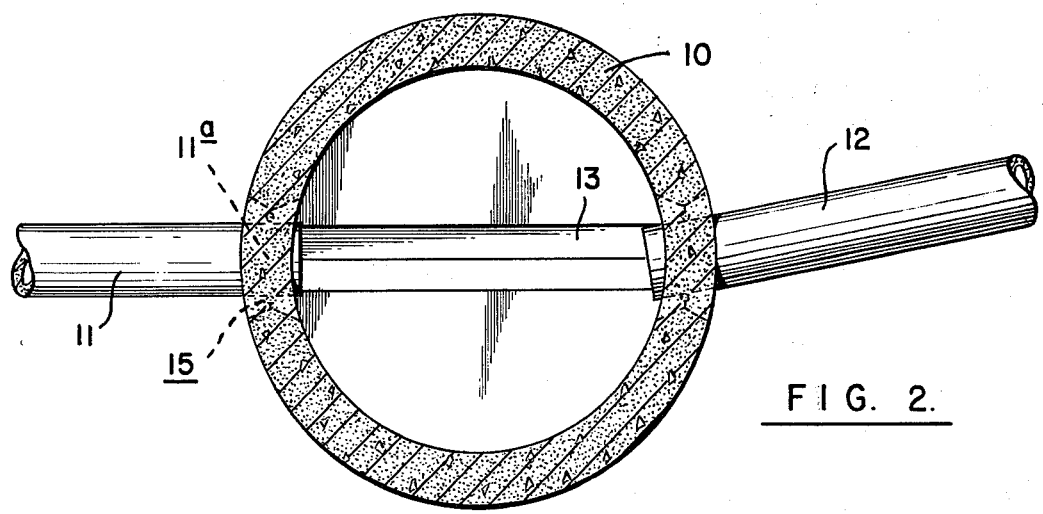
FIG. 2 is a sectional view taken on line 2—2 of FIG. 1.

Referring now to the drawings, FIG. 1 illustrates an underground structure, such as a manhole 10, into and out of which extend two lengths of pipe 11 and 12. The pipe 11 has an inner end 11a which is received within a circular aperture or port 10a provided in the manhole 10 adjacent to its bottom wall 10b. The pipe length 12 is similarly received by the manhole 10 at a diametrically opposite or other predetermined location. An invert or channel 13 cast in situ in the bottom of the manhole 10 provides a fluid connection between opposite ends of the pipe lengths 11 and 12. With this structure, fluid may flow downstream from the pipe length 11 into the manhole 10, across the invert 13, and out the pipe length 12 or vice versa.

In order to prevent fluid or sewage charged into the manhole 10 from leaking outwardly past the end of pipe 11a, and/or to prevent ground water from leaking into the inside of the manhole 10 from the annular space around the end 11a of the pipe 11, a seal 15 embodying the present invention is provided. As will be discussed, the seal 15 provides a leak resistant joint, not only when the pipe is disposed in perfect alignment with its receiving port in the manhole 10, such as the pipe 11, but also when the pipe is angled with respect to its receiving port such as the pipe 12.

Figure 3:
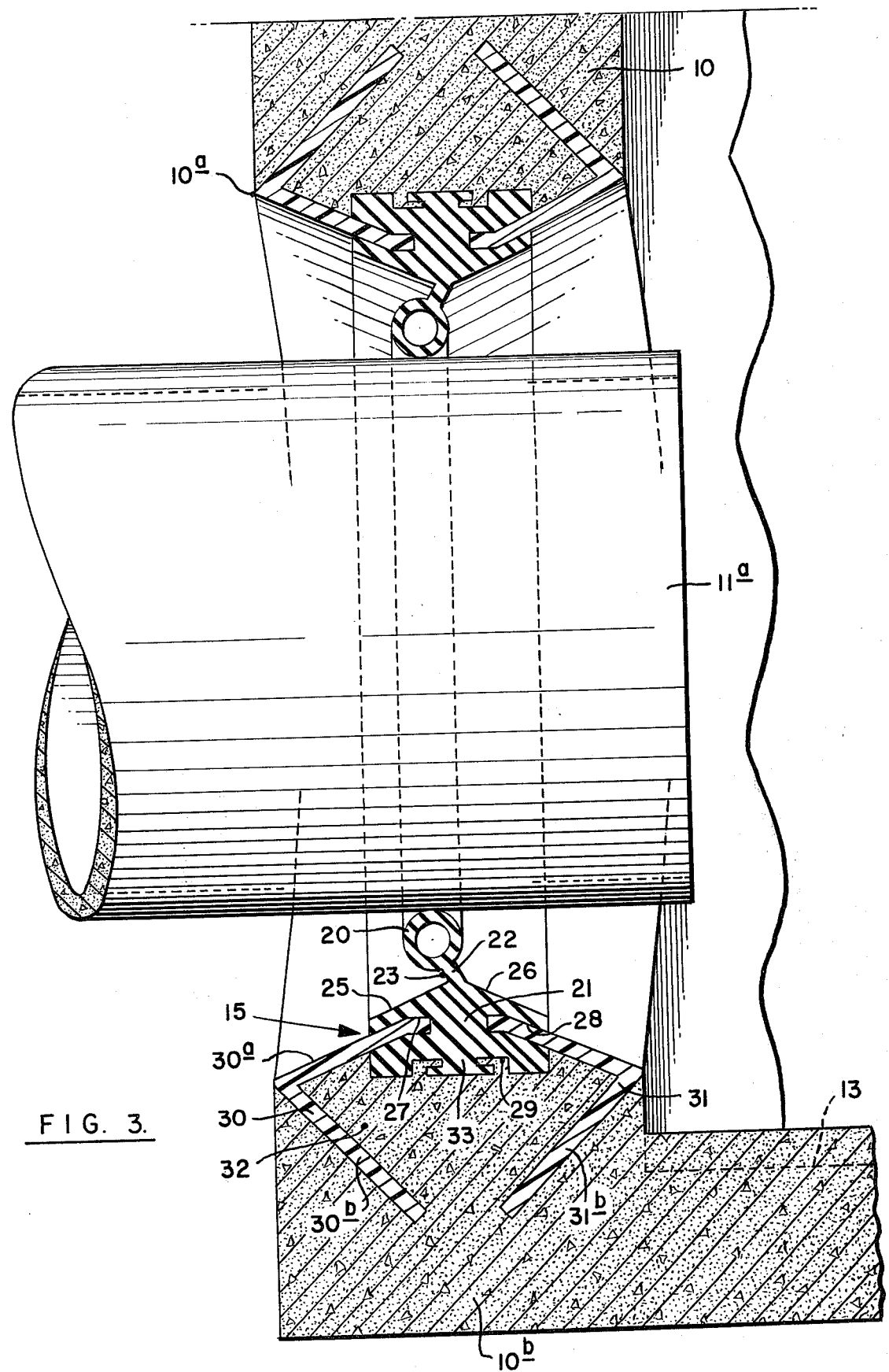
FIG. 3 is a greatly enlarged sectional view of a preferred embodiment of the seal of the present invention.

Referring now to FIG. 3, the seal 15 comprises a hollow annular ring 20 which surrounds the outer periphery of the pipe 11 to embrace the same tightly adjacent its end 11a. The ring 20 is connected to an annular base 21 by means of a narrow, flexible, continuous neck 22 which is integral with the ring 20 and the base 21. The seal 15 is preferably fabricated of relatively soft rubber or other resilient material having a hardness of about 50 Shore durometer. The seal 15 is extruded as a linear structure which is cut to length and formed into an annular shape of any desired diameter. The ends of the cut length are vulcanized to provide a unitary annular structure and to render the ring portion 20 of the seal 15 airtight. This thereby provides the ring portion with a certain degree of mechanical softness or resiliency. By way of example, for a pipe having a nominal inside diameter of 8 inches, the length of the extrusion before its ends are joined should be 33 inches for pipe fabricated of either polyvinyl chloride, clay or concrete.

The seal 15 is designed to increase its leak resistance as hydrostatic pressure increases. To this end, the seal 15 may be shaped during installation to form a pressure pocket 23. For this purpose the seal 15 is formed with the ring 20, neck 22 and base 21 having a cross-section which is symmetrical with respect to a radial line through the center of the ring 20. The neck 22 is flexible and connects the ring 20 to the base 21 in a manner affording both lateral (lengthwise of the pipe) and radial (outward of the pipe) movement of the ring 20 relative to the base 21 during installation. Thus, with the ring 20 disposed in the manner illustrated in FIG. 3, i.e. offset to the left or outside of the manhole, the pressure pocket 23 is formed on the outside of the manhole as illustrated. The pressure pocket 23 functions, when fluid pressure is applied in the rightward, or inward direction toward the inside of the manhole, to force the ring 20 more tightly into engagement with the outer periphery of the pipe end 11a and thereby to effect a tighter radial compression seal.

The pressure pocket 23 is formed during installation by first pushing the pipe 11 rightward into the manhole 10 and then pulling the pipe 11 outward. The pressure pocket 23 is located toward the outside of the manhole in those installations where hydrostatic pressure causing ground water to leak into the manhole is a greater problem than leakage of sewage from the manhole. Of course, should it be desired to place the pressure pocket 23 on the inside of the manhole in the event that leakage out of the manhole is of greater concern, this can be done simply by pushing the pipe 11 into the manhole so that the ring 20 is disposed toward the right or inside of the manhole 10, instead of toward the left as illustrated in FIG. 3.

Figure 5:
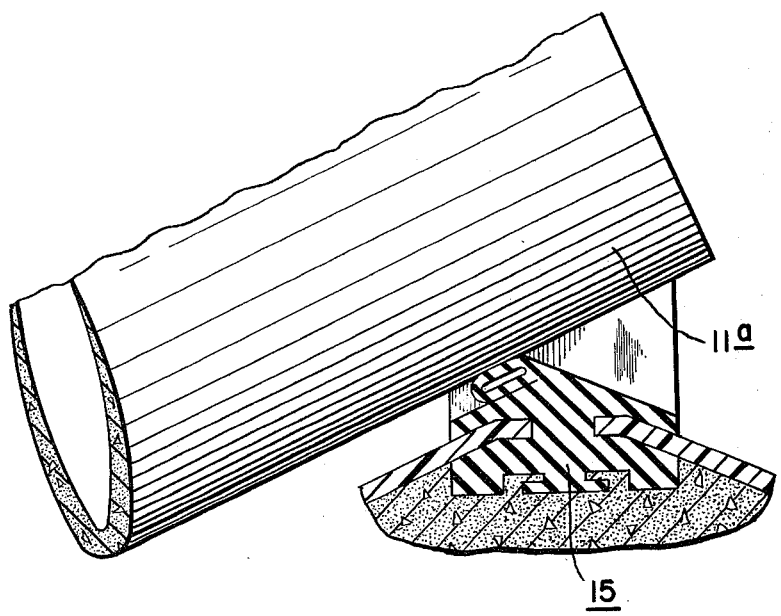
FIG. 5 is a fragmentary sectional view illustrating the manner in which the seal can be deformed to accommodate variations in the angle of the pipe relative to the manhole port.
Figure 6:
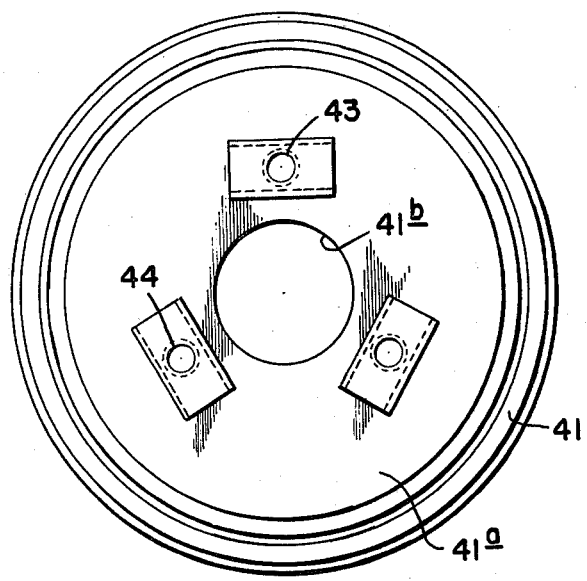
FIG. 6 is an elevational view in reduced scale of a seal installation fixture, the view looking rightward toward the fixture in FIG. 4.
Figure 7:
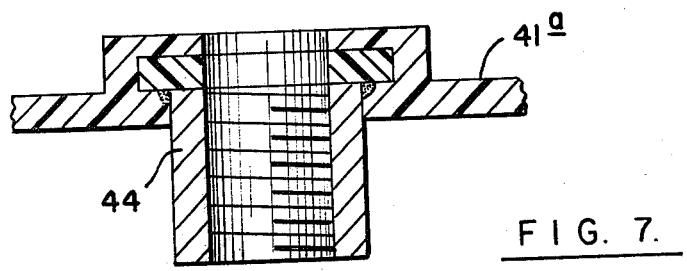
FIG. 7 is an enlarged sectional view illustrating how one of the threaded spacers is molded into place in one of the mounting rings of the installation fixture.

The seal 15 prevents the pipe 11 from being damaged in the event that excessive downward shear loads should force the pipe end 11a downwardly and tend to cause the pipe to bottom-out. To this end, the seal base 21 has a pair of continuous interior surfaces 25 and 26 which diverge at a dihedral angle of about 140° relative to one another and extend outwardly and radially with respect to the seal ring 20. The surfaces 25 and 26 extend laterally of the neck 22 beyond the outer extremity of the ring 20 so that the ring 20 can be compressed and engaged against one or the other of the surfaces 25 or 26, such as in the manner illustrated in FIG. 5 where the pipe is inclined and urged downwardly toward the bottom of the port 10a. This structure insures the interposition of a layer of resilient material between the underside of the pipe end 11a and the bottom of the port 10a in the manhole 10, thereby protecting the pipe end 11a against being broken or damaged by excessive shear loads. Air displaced from the bottom tends to exert pressure elsewhere in the seal ring 20 to help assure leak resistance.

Preferably, the seal ring 20, the neck 22 and base 21 thereof are sized so that the overall radial dimension of the seal cross-section is less than the overall lateral dimension thereof. This dimensioning facilitates the formation of the linear extrusion into an annulus by eliminating the need to twist the seal, and this in turn facilitates proper installation of the seal as will be described. By way of example, and not by way of limitation, it is preferable for the seal 15 to have a cross-section with the ring 20 having an outside diameter of 1.0 inch, an inside diameter of 0.5 inches, and a neck having a length of 0.312 inches and a thickness of 0.125 to 0.187 inches. The overall height or radial dimension of the seal should be 2.75 inches, and the overall widthwise or lateral dimension at the base should be 3.0 inches.

The seal 15 is firmly mounted in place in the manhole 10 in a manner which resists loosening and which resists the transmission of water around its outer periphery. To this end, opposite sides of the base 21 of the seal 15 are provided with a pair of lateral recesses or grooves 27 and 28 and a pair of mounting rings 30 and 31 cooperate with the base 21 to mount the seal 15 securely in the concrete of the manhole 10. As best seen in FIG. 3, each ring, such as the lefthand or outer ring 30, has a flange 30a which is received within the recess 27 and which extends outwardly therefrom to form a lateral dihedral extension of the seal base surface 25. The ring 30 also has an inturned flange 30b which extends downwardly and laterally inward with respect to the seal 15 to terminate in spaced relation with respect to the corresponding flange 31b of the companion ring 31.

The rings are preferably fabricated of a plastic material which, as will be discussed, forms a mechanical bond in the concrete. The mechanical bond is effected during pouring of the manhole 10 when concrete is flowed into the space 32 defined within the ring flanges 30b and 31b and into a peripheral groove 29 formed about the outer periphery of the seal 15. Concrete surrounding the mounting flanges 30b and 31b causes the flanges, and the seal 15, to be firmly embedded within the structure of the manhole 10. This arrangement provides the advantage, not only of preventing water from seeping laterally through the manhole wall across the outer periphery of the seal 15, but also of firmly mounting the seal 15 in the manhole port 10a. While such mounting is intended to be permanent, the seal 15 could, with some difficulty, be cut out from the mounting rings and another seal installed with the mounting ring flanges engaged in its side recesses 27 and 28.

While it is, of course, most preferable for the mounting rings 30 and 31 to be utilized, they may be omitted where the full advantages realized by their use may not be required in the particular application. In such event, the seal 15 is positioned so that concrete is flowed into its side recesses 27 and 28 where the mounting ring flanges would normally engage. This ensures that a soft surface confronts the pipe to protect it from damage. In order to provide a peripheral water block in such event, a T-shaped protrusion is provided in the peripheral recess 29 to form a labyrinth which prevents water from seeping across the outer periphery of the seal 15.

Figure 4:
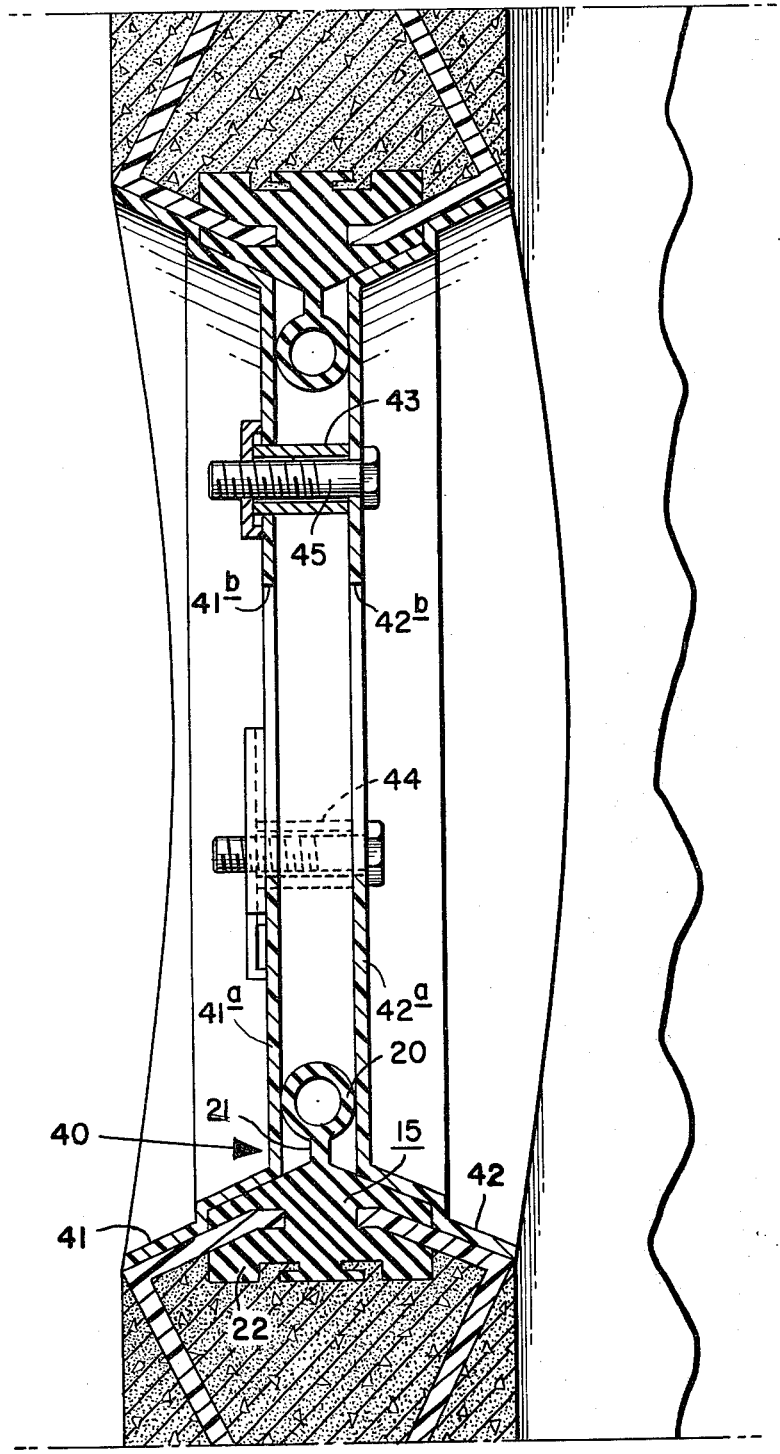
FIG. 4 is a view similar to FIG. 3 but illustrating the manner in which the seal is disposed during its casting into place in the manhole.

The seal 15 can be installed properly and readily with a minimum of skilled labor. For this purpose, an installation fixture 40 is provided to maintain the seal 15 properly disposed while the concrete of the manhole 10 is being poured. Referring now to FIG. 4 the installation fixture 40 comprises a pair of dished retainers 41 and 42 having peripheral walls shaped to engage the base 21 of the seal 15 and the flanges 30a and 31a of the mounting rings 30 and 31 in the manner illustrated. The retainers 41 and 42 have circular transverse walls 41a and 42a which extend across the manhole port 10a to engage opposite sides of the ring portion 20 of the seal 15. The walls 41a and 42a thus cooperate to maintain the seal 15 with its neck 22 erect and extending radially inward from the base 21 toward the center.

In order to prevent the ring portion 20 of the seal 15 from being compressed between the walls 41a and 42a, a series of spacers, such as the spacers 43 and 44 in FIG. 4 are molded into the retainer end wall 41a of the retainer 41 so as to abut the inside of the end wall 42a of its companion retainer 42 in the manner illustrated. The spacer 43 is internally threaded to receive a bolt 45 which, when tightened, draws the retainer walls 41a and 42a into the proper spaced parallel relation illustrated in FIG. 4. Thus, the seal 15, with its mounting rings 30 and 31 assembled therewith, may be handled as an assembly and mounted in the molds used to pour the concrete of the manhole in accordance with conventional techniques. Preferably, the retainers 41 and 42 are drawn together close enough to allow the bolts to be started by means of a compression tool (not shown) which engages opposite sides of the retainer walls 41a and 42a and which has a jackscrew extending through the holes 41b and 42b therein so that rotation of the jackscrew draws the retainers together.

After the manhole has been poured and allowed to set, the retainer bolts are loosened and the retainers 41 and 42 removed to leave the seal 15 properly installed and ready to receive a length of pipe. Preferably, the end of the pipe is lubricated before it is engaged with the seal 15 and, as noted above, the pressure pocket 23 can be formed on the outside of the manhole simply by sliding the pipe axially into the manhole and then withdrawing the same slightly to dispose the sealing ring 20 toward the outside of the manhole 10. This ensures that hydrostatic pressure on the outside of the manhole 10 will force the ring 20 into ever tighter engagement with the periphery of the pipe 11 to augment its sealing contact with the pipe as pressure increases. In the event that there should be an out-of-roundness of the pipe, the hollow ring portion 20 may be inflated with air under pressure using a needle and hand pump, or a composition capable of foaming inside the ring 20, as known in the art. In the event that excessive downward shear loads are applied to the pipe and/or the pipe is tilted with respect to the manhole port, the seal 15 deforms, such as in the manner illustrated in FIG. 5. This structure thus ensures the presence of resilient material around the bottom of the pipe and the manhole port and prevents pipe breakage even when substantial shear loads (on the order of 150 pounds per inch of pipe diameter) are applied downwardly to the pipe 11. Moreover, the mounting rings 30 and 31 cooperate with the seal base 21 to prevent gasket pull-out during assembly, thereby eliminating something which is a problem with certain commercial gaskets. This assembly also eliminates feather edges of concrete at critical locations adjacent the seal, thereby avoiding the possibility of the concrete's cracking out and allowing the seal to work loose.

In view of the foregoing it should be apparent that the present invention now provides an improved pipe seal which overcomes the limitations of prior art pipe seals and which provides a number of significant advantages, including being capable of being installed readily with a minimum of labor and in a relatively foolproof manner and being formed into various diameters to accommodate a wide range of pipe sizes.

While a preferred embodiment of the present invention has been described in detail, various modifications, alterations and changes may be made without departing from the spirit and scope of the present invention as defined in the appended claims.

I claim:

1. A resilient gasket for sealing an annular space between a pipe and a surrounding aperture in a pipe receiving structure, comprising:
   an annular ring adapted to engage the outer periphery of the pipe,
   a flexible neck integral with said ring and extending outwardly therefrom,
   a base surrounding said neck integral therewith,
   said base having a portion embedded within said pipe receiving structure and having a portion exposed to said pipe, said exposed portion extending laterally of said neck in opposite directions beyond the ring,
   said flexible neck cooperating with said base to afford both lateral and radial motion of the ring relative to the base and compression of the ring against the exposed portion of the base.

2. The gasket according to claim 1 where said neck has both lateral and radial dimensions which are substantially less than the outside diameter of said ring, and said base has a lateral dimension which is substantially wider than said ring so that the gasket has an overall radial dimension which is less than its overall lateral dimension.

3. The gasket according to claim 2 wherein the exposed portion of said base diverges outwardly and laterally at a dihedral angle relative to said neck on opposite sides thereof.

4. The gasket according to claim 3 wherein said annular ring is hollow and has a circular cross-section.

5. The gasket according to claim 4 having a cross-section which is symmetrical with respect to a radial line through the center of the ring.

6. The gasket according to claim 5 wherein said embedded portion of said base includes means defining a labyrinth about the outer periphery thereof to form a water block.

7. The gasket according to claim 6 wherein said embedded portion of said base has an annular peripheral groove and said labyrinth defining means includes a T-shaped cross-section of said base received in said groove.

8. The gasket according to claim 1 and wherein said base has a pair of laterally opening recesses intermediate said exposed portion and said embedded portion, and including a pair of mounting rings each having a lateral flange received within one of said recesses and each having outwardly extending mounting flanges embedded in said pipe receiving structure.

9. The gasket according to claim 8 wherein the lateral flange extends both radially and laterally outward and said mounting flange is radially and laterally inturned with respect to said lateral flange to receive therebetween a portion of said pipe receiving structure.

10. The gasket according to claim 9 wherein said mounting rings are continuous and are shaped to form a mechanical bond in said pipe receiving structure.

11. A gasket assembly for sealing an annular space between a pipe and a surrounding aperture in a molded pipe receiving structure, comprising:
    a compressible annular ring adapted to engage the outer periphery of the pipe,
    a base connected to said annular ring in a manner affording lateral movement of the ring relative to the base, and
    means mounting said base into the molded pipe receiving structure,
    said mounting means including means providing a pair of lateral recesses in said base and a pair of mounting rings linking said base to said structure, each of said mounting rings having lateral flanges engaging in said recesses and each having mounting flanges extending outwardly therefrom and embedded in said molded structure,
    whereby the gasket is firmly mounted in the pipe receiving structure.

12. The gasket assembly according to claim 11 wherein said annular ring is connected to said base by a narrow neck integral with said ring and said base, said neck adapted to be disposed at an angle relative to said base to enable a pressure pocket to one side of the gasket to be formed.

13. The gasket assembly according to claim 12 wherein said base extends laterally outward in opposite directions from said neck and has interior surfaces tapering laterally and radially at a dihedral angle from said neck, said lateral mounting ring flanges forming similarly tapering extensions of said interior surfaces and extending in spaced relation with said pipe to enable the pipe to be disposed at an angle with respect to its receiving structure.

14. The gasket assembly according to claim 13 wherein said annular ring has a hollow circular cross-section and is fabricated of a predetermined length of extruded rubber formed into a circle and bonded endwise.

* * * * *